United States Patent

[11] 3,597,615

[72] Inventors Anatoly Vasilievich Dolenko
4 ul. Oktiabrskogopolya 1, kv. 5;
Boris Grigorievich Egiazarov, ul
Kuusinena, 7, kv. 179; Lev Mikhailovish
Isakov, Novaya Bodraya ul, 5, kv. 71;
Vitaly Iosifovich Goldansky, Vorobiovskoe
shoose, 2-b, kv. 49; Evgeny Fredovich
Makarov, Trubnikovsky per, 11, kv. 3;
Veniamin Alexandrovich Trukhtanov,
Kremenchugskaya ul, 8, kv. 12, all of
Moscow, U.S.S.R.
[21] Appl. No. 619,290
[22] Filed Feb. 28, 1967
[45] Patented Aug. 3, 1971

[54] DETERMINING THE CONTENT OF CHEMICAL
ELEMENTS OR ISOTOPES THEREOF IN A
SPECIMEN BY UTILIZING THE EFFECT OF
RECOILLESS RESONANCE ABSORPTION OR
SCATTERING OF GAMMA RAYS
6 Claims, 3 Drawing Figs.

[52] U.S. Cl. .................................................. 250/83.3,
250/83;84
[51] Int. Cl. .................................................... G01t 1/16
[50] Field of Search ............................................ 250/83,
83.3, 84, 106 S

[56] References Cited
UNITED STATES PATENTS
3,193,683 7/1965 Reiffel ......................... 250/106 S
3,257,558 6/1966 Cook et al. .................. 250/83.3
OTHER REFERENCES
Using the Mossbauer Effect, by V. I. Goldanskii, from International Science And Technology, December 1963, pgs. 40 to 48; 250-84

Primary Examiner—Archie R. Borchelt
Attorney—Holman, Glascock, Downing and Seebold ABSTRACT: An arrangement and process for determining the content of chemical elements, isotopes or compounds thereof in a specimen comprising the measurement during irradiation of the specimen with gamma-rays of a quantity that is proportional to the content of the element, isotope or compound in the specimen.

DETERMINING THE CONTENT OF CHEMICAL ELEMENTS OR ISOTOPES THEREOF IN A SPECIMEN BY UTILIZING THE EFFECT OF RECOILLESS RESONANCE ABSORPTION OR SCATTERING OF GAMMA RAYS

BACKGROUND OF INVENTION

This invention relates to a method of determining the content of chemical elements, isotopes or compounds thereof in diverse specimens, and also relates to an arrangement for accomplishing said method.

It is known to determine the content of chemical elements in specimens by determination of the characteristic X-radiation of the element being analyzed in the specimen.

Said method makes use of X-ray equipment or gamma-ray sources which excite the characteristic X-radiation, and devices for analysis of the X-ray spectra thus produced.

It is also known to determine the content of chemical elements or isotopes thereof from the induced activity produced by irradiating the specimen under investigation with neutrons or gamma-quanta.

In said method recourse is had to neutron or gamma-ray sources for irradiating the test specimen, and devices for analyzing the gamma-ray spectrum thus obtained.

It is also known to evaluate chemical elements in solids by irradiating a solid specimen with gamma-rays that undergo resonance absorption or scattering on an impact with isotope of the element being analyzed, simultaneously determining the difference in the count rates of resonance gamma-rays, said difference corresponding to two different states of the relative motion of the gamma-ray source and solid specimen, and thereafter evaluating the chemical element in the solid specimen from the difference in count rates.

Said techniques involves the employment of devices comprising a resonance gamma-ray source, a gamma-ray detector, a mechanism for effecting the displacement of the gamma-ray source and test specimen in relation to each other, and a recording unit.

These prior art methods of chemical element analysis suffer from drawbacks in that the results of measurements depend upon the composition of test specimens, that said methods provide no means of determining various chemical compounds of the elements being analyzed, and that a special procedure is required for preparing test specimens.

Moreover, known devices for the accomplishment of said methods, are intricate, cumbersome, and in many cases inconvenient in operation, particularly under field conditions.

It is an object of the present invention to eliminate said drawbacks.

It is another object of the present invention to provide a method for determining the content of chemical elements, isotopes or compounds thereof in diverse specimens, and an arrangement for accomplishing said method, said method and arrangement being noted for their high precision and sensitivity.

It is a further object of the present invention to provide in arrangement for determining the content of chemical elements in specimens irrespective of the composition of said specimens.

It is an additional object of the present invention to provide an arrangement for determining the content of chemical elements in specimens so as to leave the specimens intact.

It is also an object of the present invention to provide an arrangement for determining the content of chemical elements in specimens that require no special techniques for their preparation.

It is a still further object of the present invention to provide an arrangement that is reliable and convenient for use under field conditions.

SUMMARY OF THE INVENTION

It is a specific object of the present invention to provide a method for determining the content of chemical elements, isotopes or compounds thereof in specimens, wherein use is made of the effect of recoilless resonance absorption or scattering of gamma-rays. The procedure involves, according to the invention, measuring, in the course of irradiation, a quantity that is proportional to the content of a chemical element, an isotope or compounds thereof in a test specimen, said quantity being represented by the following equation:

$$E = \frac{N_s - N_o}{N_s - N_b}$$

where $N_s$ is the number of pulses recorded with the radiation source and test specimen oscillating with in respect to each other, the amplitude and frequency of oscillations being selected so as to disturb the resonance conditions for most of the oscillation period;

$N_o$ is the number of pulses recorded with the gamma-ray source and specimen it rest with respect to each other;

$N_b$ is the number of pulses recorded with the gamma-ray source and test specimen at rest with respect to each other, the resonance component of radiation from the source being filtered off, and thereafter determining the quantity of an element, an isotope or compounds thereof in the test specimen by means of a calibration curve.

It is sound practice to plot the calibration curve by the techniques described hereinabove so that said curve will express the dependence of the quantities that are proportional to the content of a chemical element, an isotope or compounds thereof in reference specimens containing a specified amount of the element being analyzed, isotope or compounds thereof, upon the specified amounts of the chemical element, isotope or compounds thereof in said specimens.

Reference specimens may be prepared by compressing a mixture of an organic compound with the specified amount of the chemically pure element being analyzed, isotope or compounds thereof, said treatment being carried out so as to cause no lattice disturbance.

In the arrangement for accomplishing the present method of determining the content of chemical elements, isotopes or compounds thereof in test specimens which comprises a resonance gamma-ray source, a detector for recording gamma-quanta passing through or scattered by a test specimen, and a mechanism for setting the source and the specimen in relative motion use is made, according to the present invention, of a resonance radiation total absorption filter placed between said source and said detector, whilst the displacement mechanism is essentially a vibrator.

In the preferred embodiment, the total absorption filter may be made in the form of a plate manufactured by compressing a mixture of an organic compound with a chemically pure isotope of the element being analyzed or compounds thereof, said treatment being carried out so as to cause no lattice distortion.

The vibrator may be made in the form of a piezocrystal rigidly linked to the gamma-ray source.

DETAILED DESCRIPTION OF INVENTION

Figure 1:
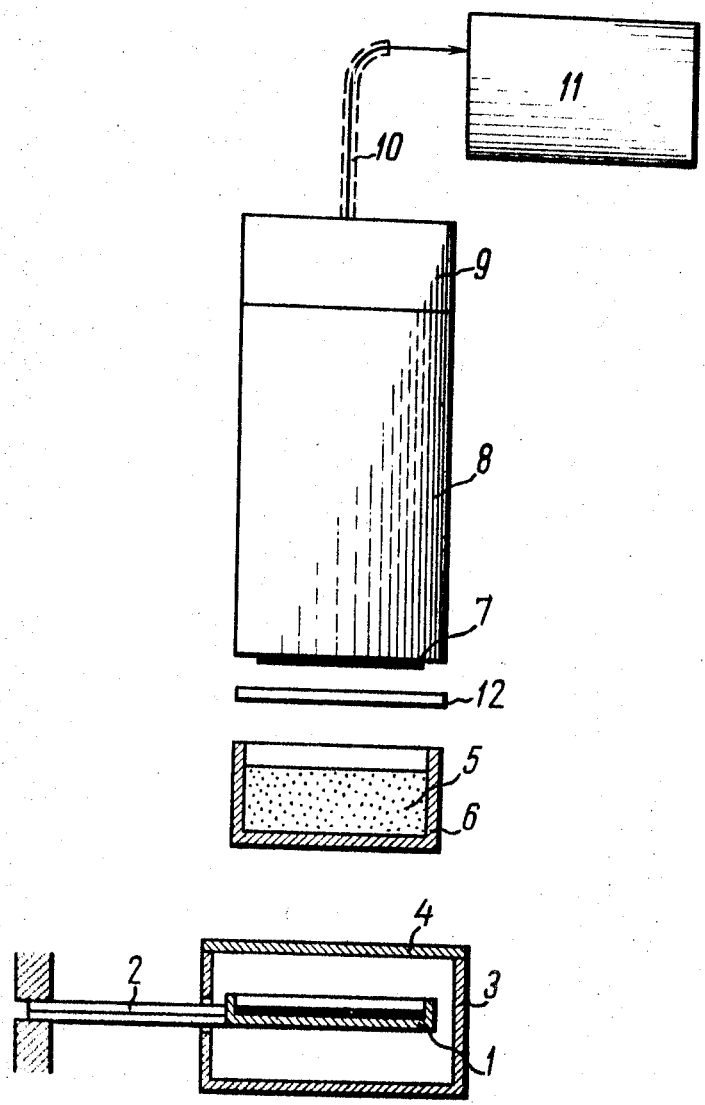
Figure 2:
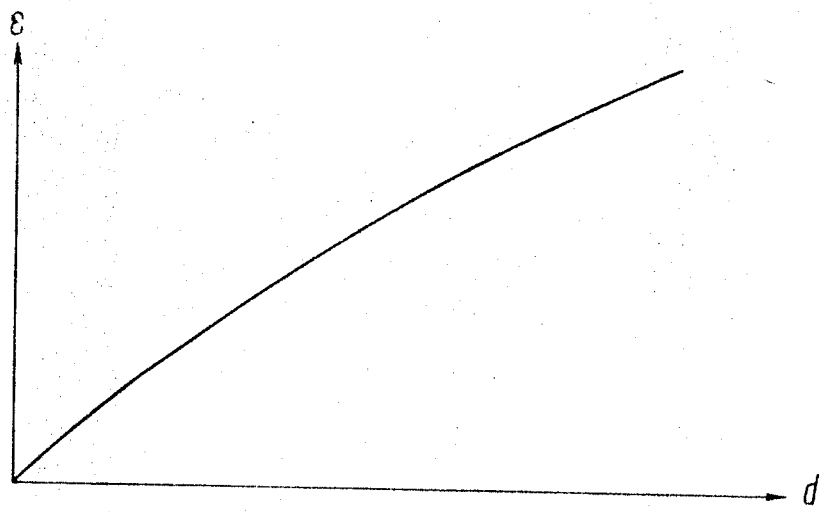
Figure 3:
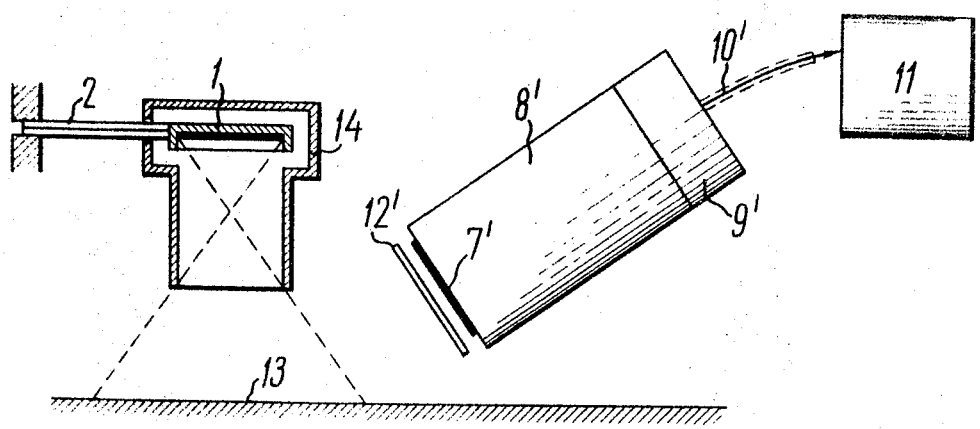

Other objects and advantages of the present invention will become apparent from the examples embodying said invention and the appended drawings, wherein:

FIG. 1 shows a device for recording the gamma-ray radiation that has passed through the specimen being analyzed, according to the invention;

FIG. 2 presents the calibration curve plotted for $Sn^{119}O_2$ reference specimens, and FIG. 3 shows the device for recording the gamma-ray radiation scattered by the specimen being analyzed according to the present invention.

In the present invention, use is made of the effect of recoilless resonance absorption and scattering of gamma-rays by nuclei of the isotope being analyzed. The present invention relates specifically to the method for determining $SnO_2$ in rock specimens and also to the arrangement for accomplishing said method.

Presented in FIG. 1 is a schematic diagram of the arrangement for carrying out the method of quantitative estimation of cassiterite ($SnO_2$) in powder samples of rocks. The arrangement comprises a measuring head and a recording unit.

The measuring head incorporates source 1 (FIG. 1) of resonance gamma-ray radiation, manufactured of $Sn^{119m}O_2$ powder on a Plexiglas disc, affixed to bimorphous piezoelectric element 2 made of polarized lead zirconate-titanate ceramics, one end of said piezoelectric element being rigidly fixed. The radiation source is housed in lead container-collimator 3, which affords shielding and also collimates the gamma-ray beam. To absorb the background characteristic radiation of the source, use is made of palladium filter 4. Powder specimen 5 of the specimen being examined is placed in special-type holder 6, which is transparent to gamma-rays. The radiation detector, which records gamma-quanta transmitted through test specimen 5, comprises thin NaI(Tl) crystal 7 and photoelectronic multiplier 8. From the detector, the signal passes via stage 9 of an emitting repeater and connecting cable 10 to recording unit 11. Disposed ahead of the detector, is resonance radiation total absorption filter 12.

Recording unit 11 incorporates an amplifier, a differential discriminator, a scaling circuit, and an electromechanical pulse counter (not shown). Starting, stopping, and resetting of the entire counting circuit are synchronized with starting, stopping, and resetting of a stop-watch also incorporated in the recording unit (not shown). In addition, the recording unit contains a battery power supply for the entire arrangement, a power pack, and a sine-wave generator for feeding the piezoelectric element (all not shown).

With radiation source 1 stationary, gamma-quanta on passing through test specimen 5 undergo resonance absorption by $Sn^{119}$ nuclei contained in $SnO_2$, so that the number of pulses $N_o$ recorded by the recording unit over a given period of time will vary with the content of $SnO_2$ in the test specimen. When sinusoidal voltage is applied to piezoelectric element 2, said element together with the radiation source starts oscillating with a resultant change in the energy of gamma-quanta because of the Doppler effect. Resonance absorption on the $Sn^{119}$ nuclei will be practically nonexistent, provided the amplitude and frequency of the radiation source oscillations are adequate for disturbing the resonance conditions for most of the oscillation period, and the recording unit will record $N\searrow$ pulses over the same period of time. Both said measurements are preformed with no detachable total absorption filter 12 ahead of the detector.

Then, ahead of the detector there is placed filter 12, which effects total absorption of the resonance radiation from $Sn^{119}O_2$. The recording unit will record, over the same period of time, $N_b$ pulses corresponding to the magnitude of background radiation sensed by the detector, said background radiation being associated with radiation due to other spectral lines of the source and, with the characteristic radiation of elements in the mother rock, etc.

When $N_b$, $N_o$, and $N\searrow$ have been measured, the quantity $\epsilon$ proportional to the content of $SnO_2$ in test specimen 5, will be calculated by recording unit 11 from the following equation:

$$\epsilon = \frac{N\searrow - N_o}{N\searrow - N_b}$$

Presented in FIG. 2 is the calibration curve for the dependence of $\epsilon$, which is proportional to the content of $SnO_2$ in a series of reference specimens containing specified amounts of $SnO_2$, upon the specified amounts d of $SnO_2$ in said reference specimens. The procedure employed for determining $\epsilon$ is identical to that disclosed hereinabove for measurements on test specimens, except that reference specimens are substituted for test specimen 5 in the present arrangement (FIG. 1).

To determine the content of $SnO_2$ in the test specimen, the procedure involves calculating the value of $\epsilon$ for the test specimen, said value being proportional to the content of $SnO_2$ in said test specimen, and making use of the calibration curve presented above to find the $SnO_2$ content sought.

Reference specimens may be plates obtained by compressing a mixture of an organic compound with a specified, highly accurate amount of chemically pure $SnO_2$, provided the compression involves no lattice disturbance.

The total absorption filter comprises a plate made by compressing a mixture of an organic compound with $SN^{119}O_2$ in an amount adequate for the total absorption of resonance gamma-ray radiation.

An analogous procedure could be followed for the determination of the content of $SnO_2$ directly in the surface layers of test specimens 13 (FIG. 3). Here gamma-ray radiation from source 1, which is applied to bimorphous piezoelectric element 2 and placed in container-collimator 13, falls onto the surface of test specimen 13, and the gamma-quanta scattered by the surface of test specimen 13 are recorded by a detector comprised of thin NaI(Tl) crystal $7^1$ and photoelectric multiplier $8^1$. Disposed ahead of said detector is detachable, resonance radiation total absorption filter $12^1$, and from said detector the signal is fed via stage $9^1$ of an emitting repeater and connecting cable $10^1$ to recording unit 11.

In the embodiment of the present arrangement described hereinabove, the value of $\epsilon$, which is proportional to the content of $SnO_2$ in the test specimen, is derived from the following equation:

$$\epsilon = \frac{N_o - N\searrow}{N\searrow - N_b}$$

When use is made of a $Sn^{119m}O_2$ source having an activity on the order of a millicurie, the present arrangements (FIG. 1 and 2) make it possible to determine the content of tin in cassiterite within 10 minutes to 0.05—5 percent, an accuracy which compares favorably with that obtainable by chemical methods of analysis.

Although the present invention has been described with reference to a preferred embodiment thereof, it is apparent that various alternations and modifications may be made therein without deviating from the spirit and scope of the invention, as those skilled in the art will readily understand.

Such alterations and modifications shall be considered as falling within the spirit and scope of the invention as set forth in the appended claims.

We claim:

1. A method of determining the content in specimens of a member selected from the group consisting of chemical elements, isotopes and compounds thereof, consisting essentially in that the specimen is irradiated with gamma-quanta of being resonantly absorbed and dispersed by an isotope of the element being determined, determining the ratio of the difference of the number of gamma-quanta registered when the source and the specimen oscillate with respect to each other with an amplitude and frequency of oscillations sufficient for violating the conditions of resonance for the greatest part of the period of oscillations, and the number registered when the source and the specimen are at rest with respect to each other, to the said number of gamma-quanta registered when the source and the specimen oscillate with respect to each other, or due to the background induced by the nonresonant component of the radiation of the source, and employing said ratio to compute the quantitative content of the said element in the said specimen by means of a graduating relationship.

2. A method according to claim 1 wherein said member is $Sn^{119}O_2$.

3. A method of determining the content in specimens of a member selected from the group consisting of chemical elements, isotopes and compounds thereof, consisting essentially in that the specimen is irradiated with gamma-quanta capable of being resonantly absorbed and dispersed by an isotope of the element being determined, determining the ratio of the difference of the number of gamma-quanta registered when the source and the specimen oscillate with respect to each other with an amplitude and frequency of oscillations sufficient for violating the conditions of resonance for the greatest part of the period of oscillations, and the number registered when the source and the specimen are at rest with respect to each other, to the said number of gamma-quanta registered when the source and the specimen oscillate with respect to each other, due to the background induced by the nonresonant component of the radiation of the source, applying a graduating relationship as the relationship of the said ratios of standard specimens with a given quantity of the said member to the said quantities of the said member in the standard specimens, and utilizing the said ratio to compute the quantitative content of the said element in the specimen being investigated with the aid of the said graduating relationship.

4. A method of determining the content in specimens of a member selected from the group consisting of chemical elements, isotopes and compounds thereof, consisting essentially in that the specimen is irradiated with gamma-quanta capable of being resonantly absorbed and dispersed by an isotope of the element being determined, determining the ratio of the difference of the number of gamma-quanta registered when the source and the specimen oscillate with respect to each other with in amplitude and frequency of oscillations sufficient for violating the conditions of resonance for the greatest part of the period of oscillations, and the number registered when the source and the specimen are at rest with respect to each other, to the said number of gamma-quanta registered when the source and the specimen oscillate with respect to each other, due to the background induced by the nonresonant component of the radiation of the source, pressing standard specimens from a mixture of an organic substance with a given quantity of the chemically pure said member without violation of its crystalline lattice, applying a graduating relationship as the relationship of the said ratios of said standard specimens to the said given quantities of the said member in the said standard specimens, and utilizing the said ratio to compute the quantitative content of the said element in the specimen being investigated with the aid of the said graduating relationship.

5. An arrangement for determining the content in specimens of a member selected from the group consisting of chemical elements, isotopes, or compounds thereof, comprising a source of resonance radiation; a detector for registering gamma-quanta from said source that have passed through the specimen being investigated, or have been dispersed by it; a filter for total absorption of the resonance radiation in the form of a plate made by pressing a mixture of an organic substance with a chemically pure isotope of the said member being investigated without violation of their crystalline lattice, arranged between said source of resonance radiation and the specimen being investigated.

6. An arrangement for determining the content of a member selected from the group consisting of elements, isotopes, and compounds thereof, in specimens which comprises a resonance radiation source; a detector for recording gamma-quanta from said source that have passed through or have been scattered by a said specimen; a resonance radiation total absorption filter disposed between said resonance radiation source and said detector; and a vibrator means comprising a piezoelectric element which is rigidly coupled to said resonance radiation source and serves to set said source in motion relative to the test specimen.